(12) United States Patent
Kim et al.

(10) Patent No.: US 10,813,202 B2
(45) Date of Patent: Oct. 20, 2020

(54) METHOD AND SYSTEM FOR VISION-BASED AUTOMATIC FAULT NOTIFICATION AND CLASSIFICATION OF SYSTEM LIGHTING

(71) Applicant: ELECTRONICS AND TELECOMMUNICATIONS RESEARCH INSTITUTE, Daejeon (KR)

(72) Inventors: Hyunseok Kim, Daejeon (KR); Tae-Gyu Kang, Daejeon (KR); Dae Ho Kim, Sejong-si (KR); You Jin Kim, Daejeon (KR); Ji Hun Jeon, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 154 days.

(21) Appl. No.: 16/158,673

(22) Filed: Oct. 12, 2018

(65) Prior Publication Data

US 2019/0320519 A1    Oct. 17, 2019

(30) Foreign Application Priority Data

Apr. 17, 2018   (KR) .................... 10-2018-0044363

(51) Int. Cl.
*H05B 47/20* (2020.01)
*G06N 3/08* (2006.01)

(52) U.S. Cl.
CPC ............... *H05B 47/20* (2020.01); *G06N 3/08* (2013.01)

(58) Field of Classification Search
CPC .................... H05B 47/20–47/235; G06N 3/08
See application file for complete search history.

(56) References Cited

U.S. PATENT DOCUMENTS

| | | | |
|---|---|---|---|
| 9,489,832 B2 * | 11/2016 | Nair ...................... | G08C 17/02 |
| 2005/0240376 A1 | 10/2005 | Uwatoko et al. | |
| 2014/0009083 A1 | 1/2014 | Park et al. | |
| 2014/0306609 A1 | 10/2014 | Kang et al. | |
| 2018/0332261 A1 * | 11/2018 | Zhang ................ | H04N 21/4223 |
| 2020/0097753 A1 * | 3/2020 | Ash ...................... | G06K 9/2036 |
| 2020/0128649 A1 * | 4/2020 | Zhang .................... | H05B 47/20 |

FOREIGN PATENT DOCUMENTS

| | | |
|---|---|---|
| JP | 2006-210114 A | 8/2006 |
| KR | 10-1173633 B1 | 8/2012 |
| KR | 10-2013-0130497 A | 12/2013 |
| KR | 10-2015-0093871 A | 8/2015 |

* cited by examiner

*Primary Examiner* — Joseph R Kudirka
(74) *Attorney, Agent, or Firm* — LRK Patent Law Firm

(57) ABSTRACT

A lighting fault diagnosis method includes determining a fault item among a plurality of fault items based on fault symptom data of a test for each fault item, and recommending a repair method suitable for the determined fault item.

14 Claims, 11 Drawing Sheets

METHOD AND SYSTEM FOR VISION-BASED AUTOMATIC FAULT NOTIFICATION AND CLASSIFICATION OF SYSTEM LIGHTING

CROSS-REFERENCE TO RELATED APPLICATION(S)

This application claims the priority benefit of Korean Patent Application No. 10-2018-0044363, filed Apr. 17, 2018 in the Korean Intellectual Property Office, the disclosure of which is incorporated herein by reference for all purposes.

BACKGROUND

1. Field of the Invention

One or more example embodiments relate to a method and apparatus that may automatically diagnose a fault based on a fault image captured by a user when the fault occurs in a system lighting including a smart light, a smart sensor, a gateway, a user input device, and a control device, receive similar fault symptom and repair case information from a fault database (DB), and help a user to directly determine whether a simply replacement is needed or a repair service request is needed.

2. Description of Related Art

In general, an existing system lighting fault notification is performed in a manner that a user recognizes a fault of lighting and contacts a call center or personally visits a service center to make a fault notification, and the call center requests a skilled service engineer to repair the lighting. In this example, it takes a long time from the fault recognition to the repair, an unnecessary cost for travel and call-out is incurred, and the user should wait for the service engineer even if a very simple repair is needed.

SUMMARY

An aspect a method and system that may capture an image of a fault of a system lighting including a smart light, a smart sensor, a gateway, a user input device, and a control device through a smart phone app, make a fault notification to a system light cloud database (DB) using the image, automatically diagnose a fault item, receive similar fault symptom and repair case information from a fault DB, and help a user to directly determine whether a simply replacement is needed or a repair service request is needed, thereby reducing a maintenance cost.

According to an aspect, there is provided a method for fault diagnosis of a lighting, the method including receiving fault symptom data of a test for each of one or more predetermined fault items, the fault symptom data tagged with the fault items, based on the test for each of the one or more predetermined fault items, determining a first fault item among the one or more predetermined fault items, retrieving a fault comparison image corresponding to the first fault item from a fault symptom image DB, diagnosing whether the fault symptom data corresponds to the first fault item by comparing fault symptom data tagged with the first fault item to the fault comparison image, and recommending a repair method based on the fault symptom image DB when the fault symptom data corresponds to the first fault item.

The determining may be iteratively performed while a predetermined condition is satisfied.

The predetermined condition may include a condition to iteratively perform the determining with respect to all of the one or more predetermined fault items in an order of high frequency count.

The recommending may include recommending the repair method using a neural network trained with data accumulated in the fault symptom image DB through deep learning.

The method may further include labeling and storing the fault symptom data in the fault symptom image DB when the fault symptom data corresponds to the first fault item.

The diagnosing may include determining a predetermined determination method corresponding to the first fault item, and comparing the fault symptom data tagged with the first fault item to the fault comparison image based on the determination method.

The predetermined determination method may include at least one of a per unit time brightness change data comparison, a per unit time brightness peak-to-peak variation comparison, an image color coordinate comparison, an image audio output comparison, and a brightness change timepoint comparison.

The diagnosing may include diagnosing whether a fault occurs using a data comparison algorithm including a mean squared error (MSE) and a correlation analysis.

The fault symptom data may include audio information and image information.

The one or more predetermined fault items may include at least one of dimming, a flicker, a color temperature, noise, and a response delay.

According to an aspect, there is provided an apparatus for fault diagnosis of a lighting, the apparatus including a receiver configured to receive fault symptom data of a test for each of one or more predetermined fault items, the fault symptom data tagged with the fault items, based on the test for each of the one or more predetermined fault items, a fault symptom image DB in which a fault symptom image is pre-stored, a diagnoser configured to determine a first fault item among the one or more predetermined fault items, retrieve a fault comparison image corresponding to the first fault item from a fault symptom image DB, and diagnose whether the fault symptom data corresponds to the first fault item by comparing the fault symptom data tagged with the first fault item to the fault comparison image, and a recommender configured to recommend a repair method based on the fault symptom image DB when the fault symptom data corresponds to the first fault item.

According to an aspect, there is provided a method of generating fault symptom data, the method including controlling a lighting by executing a test control instruction for each fault item, capturing an image of the lighting, tagging and storing the captured image for each fault item, receiving a user opinion in relation to a fault symptom, generating fault symptom data of a test for each fault item based on device information of the lighting, the tagged image, and the user opinion, and transmitting the fault symptom data of the test for each fault item to a server.

The method may further include automatically extracting unique information of the lighting by recognizing a quick response (QR) code attached to the lighting.

The method may further include performing an image segmentation to segment a region corresponding to the lighting in all frames of the captured image, and normalizing the image.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION OF THE INVENTION

Figure 1:
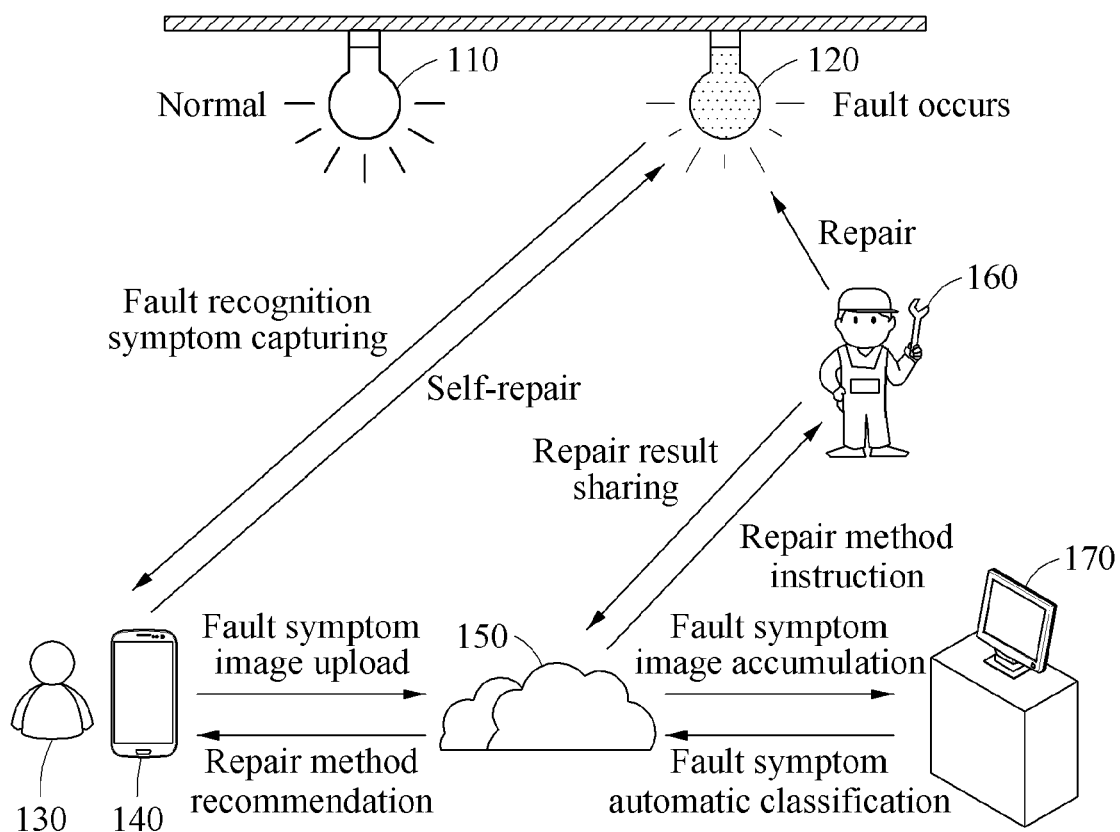
FIG. 1 illustrates a system for automatic fault diagnosis of a system lighting and repair method recommendation according to an example embodiment.

Hereinafter, example embodiments will be described in detail with reference to the accompanying drawings. Various alterations and modifications may be made to the examples. Here, the examples are not construed as limited to the disclosure and should be understood to include all changes, equivalents, and replacements within the idea and the technical scope of the disclosure.

As used herein, the singular forms are intended to include the plural forms as well, unless the context clearly indicates otherwise. It should be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined herein, all terms used herein including technical or scientific terms have the same meanings as those generally understood by one of ordinary skill in the art. Terms defined in dictionaries generally used should be construed to have meanings matching with contextual meanings in the related art and are not to be construed as an ideal or excessively formal meaning unless otherwise defined herein.

When describing the examples with reference to the accompanying drawings, like reference numerals refer to like constituent elements and a repeated description related thereto will be omitted. When it is determined detailed description related to a related known function or configuration they may make the purpose of the examples unnecessarily ambiguous in describing the examples, the detailed description will be omitted here.

FIG. 1 illustrates a system for automatic fault diagnosis of a system lighting 120 and repair method recommendation according to an example embodiment.

Referring to FIG. 1, in an example in which a fault occurs in the system lighting 120, a user 130 recognizing the fault may receive an automatic fault diagnosis and a repair method recommendation using a smart phone 140.

The user 130 may capture an image of a fault symptom using a smart phone 200 when recognizing the fault of the system lighting 120. Fault symptom data may be generated based on the captured image. The generated fault symptom data may be registered to a cloud database (DB) server 150. At the same time, whether a fault occurs and a fault item when a fault occurs may be automatically diagnosed through a fault diagnosis apparatus 170. An operating method of the fault diagnosis apparatus will be described in detail later.

If whether a fault occurs and the fault item are specified, a repair method may be recommended based on similar fault symptom and repair case information from a fault symptom image DB. By receiving a recommendation of the repair method, the user 130 may determine whether to perform a self-repair such as power restart, module reinsertion or product replacement or a repair service request, whereby a time and cost for maintenance may be reduced.

The system lighting 120 may include a smart light, a smart sensor, a gateway, a user input device, and a control device. The user 130 may be provided with an automatic fault diagnosis and repair method recommendation service using a system lighting fault notification app installed on the smart phone 140.

The user 130 may notify of a fault symptom using the smart phone 140 when an abnormality of the system lighting 120 is sensed. The smart phone 140 may transmit, to the system lighting 120, a control signal suitable for a predetermined test for each fault symptom, to obtain data needed to determine the fault symptom of the system lighting 120. While a plurality of tests is performed automatically, the user 130 may capture an image of the system lighting 120 using the smart phone 140.

The fault diagnosis apparatus 170 may collect and accumulate test data. The fault diagnosis apparatus 170 may automatically classify the fault symptom by comparing the collected data to normal samples and abnormal samples for each test. Further, the fault diagnosis apparatus 170 may automatically classify the fault symptom using a neural network pre-trained through deep learning and automatically recommend a repair method suitable for the classified fault symptom.

The fault diagnosis apparatus 170 may match test images captured by the user 130 with repair methods and store the test images matched with the repair methods to train the neural network. At an early stage, the system of FIG. 1 may recommend a call-out of a repair service engineer in many cases. A repair method determined by the servicer engineer having expertise may be stored in the DB, and the neural network may be trained to recommend a repair method corresponding to a test image. The neural network may be trained highly over time and then, more recommend self-repair methods not requiring a call-out of a repair service engineer.

Figure 2:
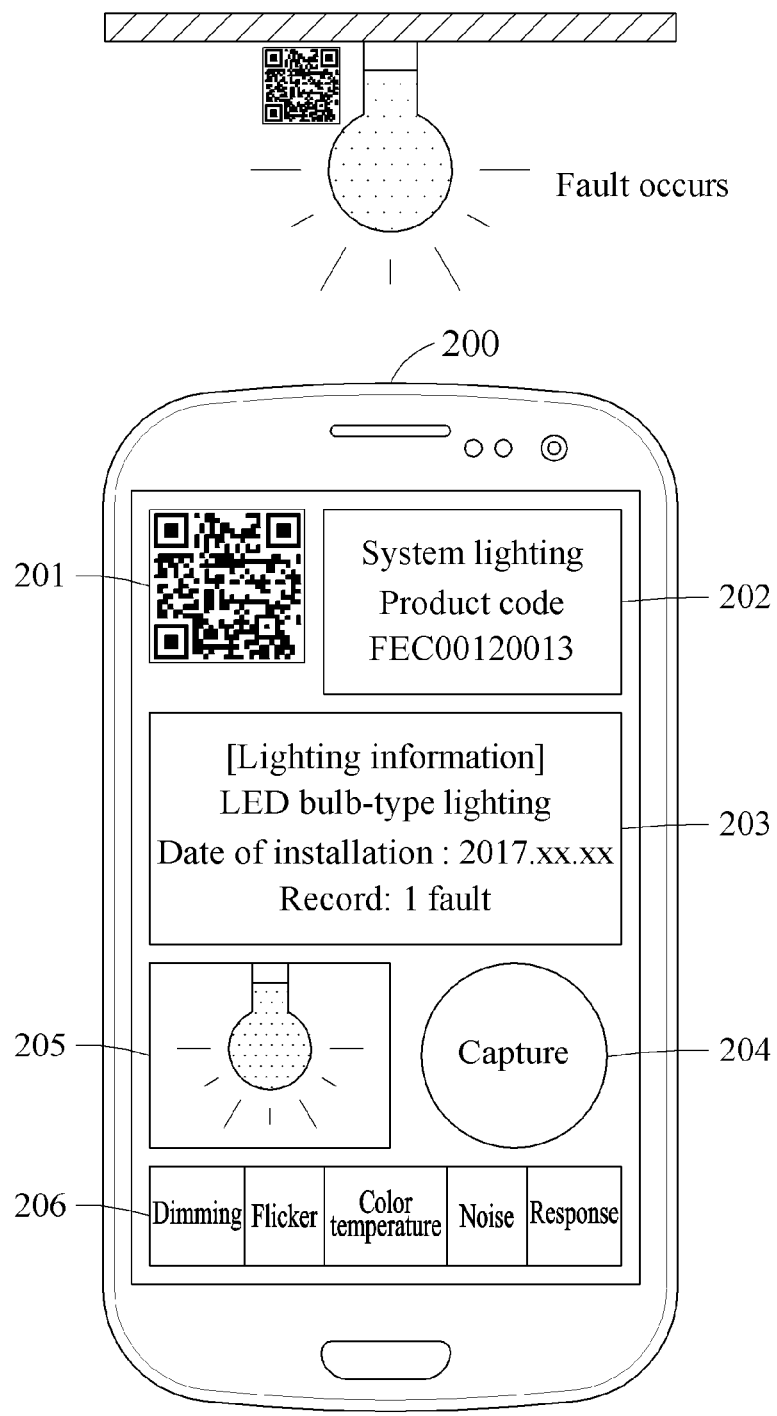
FIG. 2 illustrates a fault notification method according to an example embodiment.

FIG. 2 illustrates a fault notification method according to an example embodiment.

Referring to FIG. 2, a fault notification method may include an operation of extracting lighting device information, an operation of capturing an image of a fault symptom, and an operation of performing a test procedure for each fault item.

A fault notification may be made using a fault notification app. For example, the corresponding lighting device information may be automatically extracted using a camera of the smart phone 200. When a quick response (QR) code attached to a system lighting is recognized, a QR code 201 and unique product information 202 of the corresponding lighting device may be extracted and displayed on a screen of the smart phone 200. Based on the unique product information 202, installation and fault records 203 of the corresponding lighting may be received from a system lighting fault cloud DB system. In an example in which a QR code 201 in unavailable, the information may be input manually.

When the fault symptom of the system lighting is captured by pressing a capture button 204, a corresponding image 205 may be stored. According to a test procedure 206 for each predefined fault item, a test control instruction for each lighting fault item may be executed. The test procedure for each fault item will be described in detail later. The image may be stored while being tagged with the executed instruction.

Figure 3:
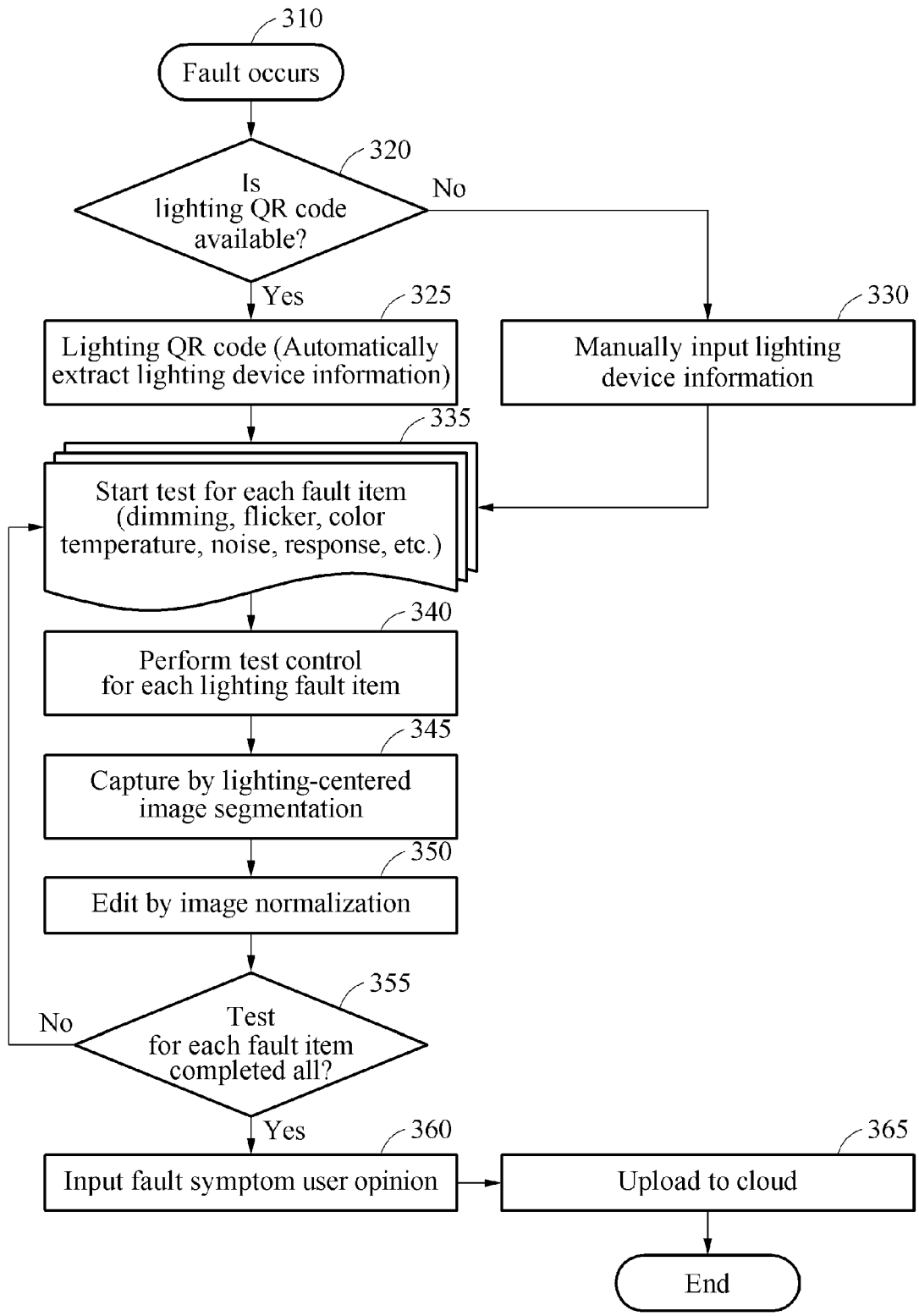
FIG. 3 is a flowchart illustrating a fault notification according to an example embodiment.

FIG. 3 is a flowchart illustrating a fault notification according to an example embodiment.

Referring to FIG. 3, when a fault occurs, in operation 310, whether a QR code is available in a system lighting may be determined, in operation 320. In an example in which a QR code is not attached to the system lighting, a user may input unique product information of a lighting device manually based on a product purchase statement, in operation 330. In an example in which a QR code is available, the unique product information of the lighting device may be recognized automatically, in operation 325. When the unique product information is recognized, the user may capture a lighting fault symptom using a camera of a smart phone.

According to a test procedure 335 for each predefined fault item, a test control instruction for each lighting fault item may be executed, in operation 340. One or more predetermined fault items may include at least one of dimming, a flicker, a color temperature, noise, and a response delay. In operation 345, an image segmentation may be performed to segment and capture a region corresponding to the lighting in all frames of the captured image. In operation 350, an edit by image normalization may be performed such that a size of the lighting may have a predetermined proportion and a predetermined brightness histogram in all the frames. The edited image tagged with each fault item may be stored, and a test for each fault item may be repeated until the test procedure for each predefined fault item is completed, in operation 355.

When the test procedure for each predefined fault item is completed all, a finally edited image may be replayed for the user, and the user may select a fault symptom and a classification assumed by the user and input an opinion, in operation 360. Fault symptom data of a test for each fault item may be generated based on the lighting device information, the tagged image, and the user opinion. The generated fault image data may be uploaded to the system lighting fault cloud DB system, in operation 365.

Figure 4:
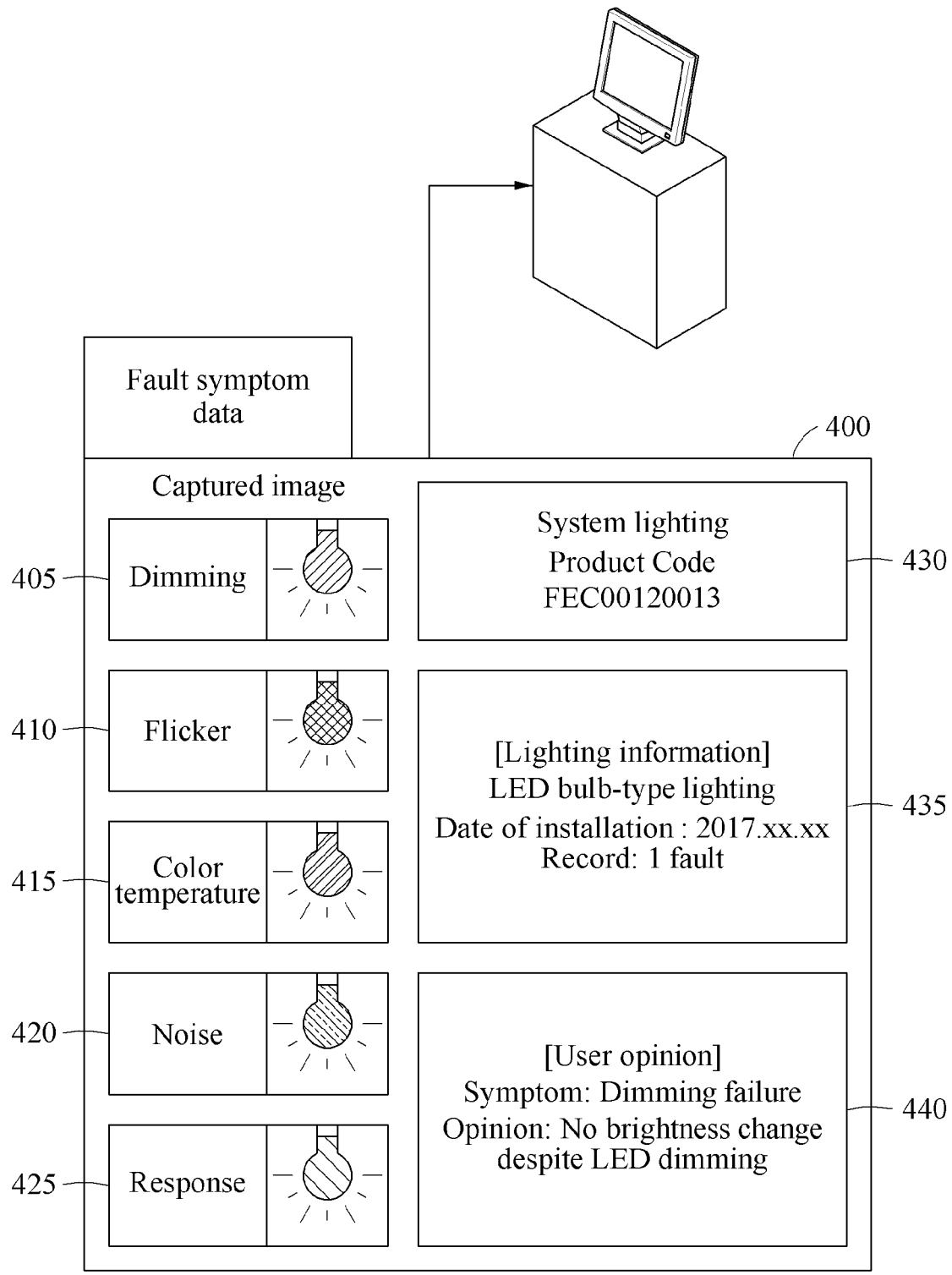
FIG. 4 illustrates fault symptom data according to an example embodiment.

FIG. 4 illustrates fault symptom data according to an example embodiment.

Referring to FIG. 4, fault symptom data 300 may include a fault image captured according to a test procedure for each predefined fault item, lighting device unique product information 430, lighting device record 435, and a user-determined fault classification, symptom and opinion 440 with respect to a fault symptom. For example, the lighting device unique product information may be "Product Code FEC00120013", and the record may be "installed on 2017.XX.XX and 1 fault". In relation to the user opinion, the symptom may be "dimming failure", and the opinion may be "no brightness change despite LED dimming".

The fault image captured according to the test procedure for each predefined fault item may include at least one of a dimming related image 405, a flicker related image 410, a color temperature related image 415, a noise related image 420, and a response related image 425.

When the fault symptom data is generated, whether a fault occurs and a fault item may be diagnosed based on the fault symptom data, and a repair method corresponding to the fault item may be recommended.

A lighting fault diagnosis method may include an operation of receiving fault symptom data of a test for each of one or more predetermined fault items, the fault symptom data tagged with the fault items, based on the test for each of the one or more predetermined fault items, an operation of determining a first fault item among the one or more predetermined fault items, an operation of retrieving a fault comparison image corresponding to the first fault item from a fault symptom image DB, an operation of diagnosing whether the fault symptom data corresponds to the first fault item by comparing fault symptom data tagged with the first fault item to the fault comparison image, and an operation of recommending a repair method based on the fault symptom image DB when the fault symptom data corresponds to the first fault item.

The operation of determining a first fault item among the one or more predetermined fault items may be iteratively performed while a predetermined condition is satisfied. The predetermined condition may be, for example, a condition to not diagnose any further in response to a diagnosis that the fault symptom data corresponds to a predetermined fault item. The predetermined condition may be, for example, a condition to iteratively perform the determining with respect to all of the one or more predetermined fault items in an order of high frequency count.

The operation of diagnosing whether the fault symptom data corresponds to the first fault item may include an operation of determining a predetermined determination method corresponding to the first fault item, and an operation of comparing the fault symptom data tagged with the first fault item to the fault comparison image based on the determination method. The predetermined determination method may include at least one of a per unit time brightness change data comparison, a per unit time brightness peak-to-peak variation comparison, an image color coordinate comparison, an image audio output comparison, and a brightness change timepoint comparison. The examples will be described in detail later.

When the fault symptom data corresponds to the first fault item, the fault symptom data may be labeled and stored in the fault symptom image DB. The stored fault symptom data may be utilized as training data in the future.

Figure 5:
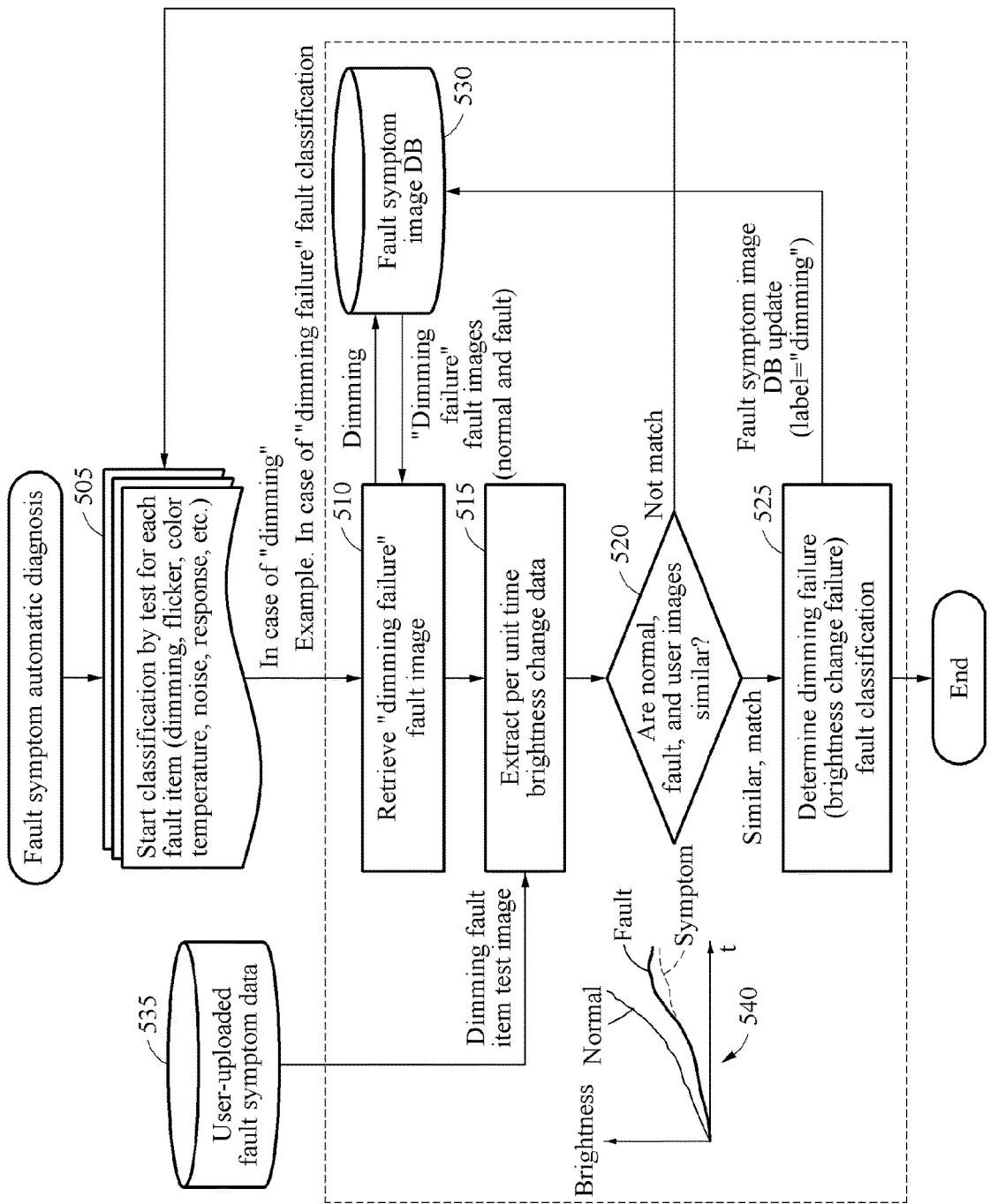
FIG. 5 is flowchart illustrating a fault symptom automatic diagnosis with respect to a "dimming failure" fault according to an example embodiment.

FIG. 5 is flowchart illustrating a fault symptom automatic diagnosis with respect to a "dimming failure" fault according to an example embodiment.

Referring to FIG. 5, a fault symptom automatic diagnosis system may be utilized to diagnose fault symptom data uploaded by a user based on an item. An example in which a lighting fault item corresponds to "dimming" is illustrated. A "dimming" related fault may indicate an example in which a user cannot adjust a brightness as desired, for example, the brightness does not change at all in response to a brightness change instruction (rate ranging 0~100%) of the lighting, or the brightness changes at an excessive rate or an insignificant rate.

The fault symptom image data uploaded by the user may be analyzed. In operation 535, fault symptom data tagged with "dimming" in an image captured according to a test procedure for each predefined fault item may be received. In operation 510, a fault image classified as "dimming failure" corresponding to the "dimming" related fault may be retrieved from the fault symptom image DB. For a comparison, a normal image as well as the fault comparison image classified as "dimming failure" may be retrieved.

The image of the fault symptom data tagged with "dimming" may be compared to the fault comparison image and the normal image. In an example in which the image of the fault symptom data is classified as the "dimming" fault, a graph may be drawn by scaling an average brightness change in an image frame per unit time from "0" to "1" based on the normal image and the fault comparison image, in operation 515. A graph with respect to the image of the fault symptom data captured by the user may also be drawn in the same manner. The normal image, the fault comparison image, and the image graph of the fault symptom data may be compared. Referring to a graph 540 in which the normal image, the fault comparison image, and the image of the fault symptom data are shown together, the graph of the fault symptom data is more similar to the fault comparison image graph than the normal image graph, and thus the fault symptom data may be diagnosed to correspond to the "dimming" related symptom. For a more precise comparison, various data comparison algorithms such as a mean squared error (MSE) and a correlation analysis may be used to determine whether the fault symptom data corresponds to a normality or a fault, in operation 520.

In an example in which the graph of the fault symptom data is similar to or matches the fault graph as a result of determination, the image of the fault symptom data may be recognized as a fault image, labeled with "dimming", and additionally updated and stored in the fault symptom image DB so as to be used as training data in the future, in operation 530, and the fault symptom data may be determined to be the "dimming" fault, in operation 525.

Figure 6:
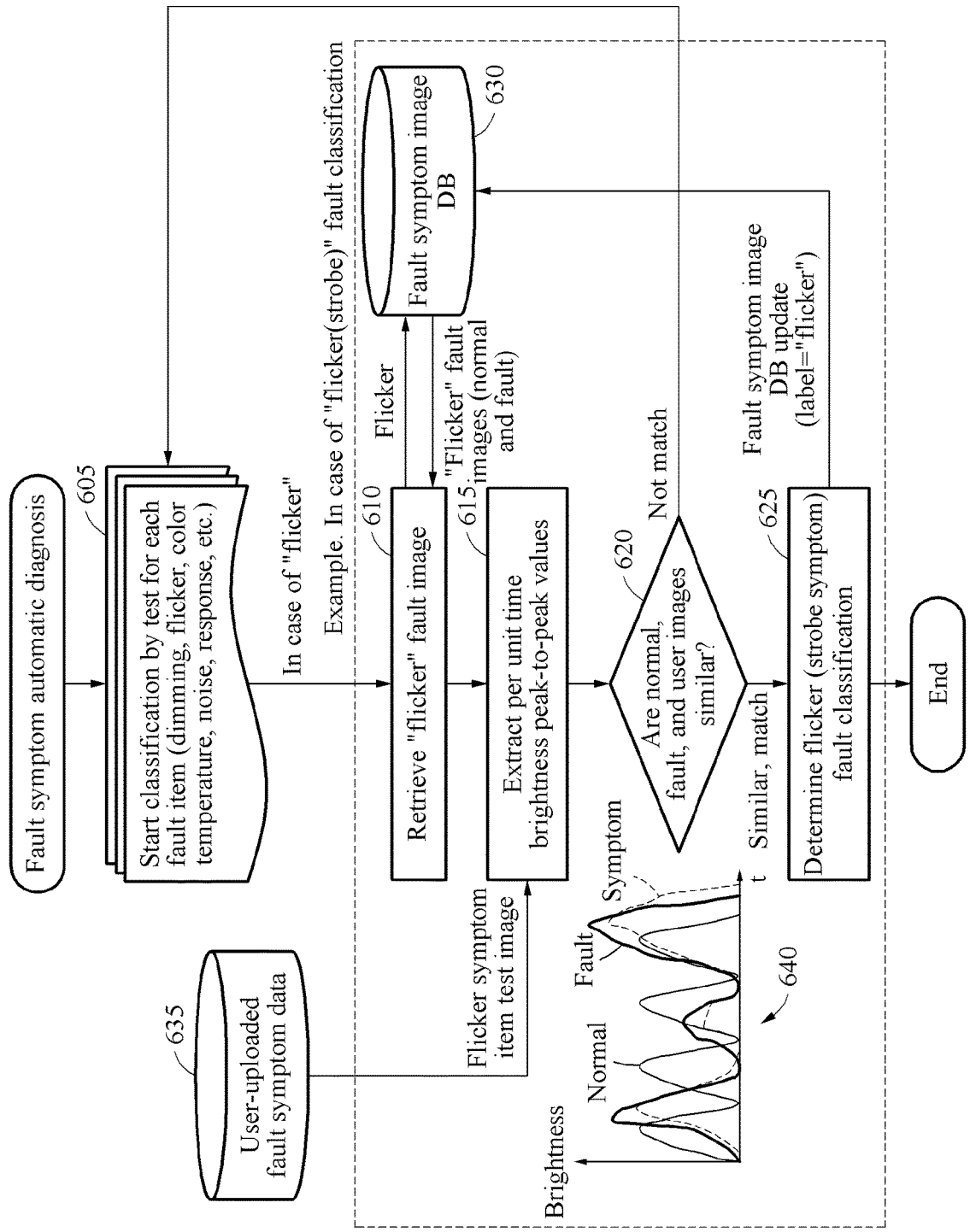
FIG. 6 is a flowchart illustrating a fault symptom automatic diagnosis with respect to a "flicker" fault according to an example embodiment.

FIG. 6 is a flowchart illustrating a fault symptom automatic diagnosis with respect to a "flicker" fault according to an example embodiment.

Referring to FIG. 6, a fault symptom automatic diagnosis system may be utilized to diagnose fault symptom data uploaded by a user based on an item. An example in which a lighting fault item corresponds to "flicker" is illustrated. A "flicker" related fault may indicate an example in which a lighting shows quick brightness changes per unit time rather than shining with a constant brightness such that a user may view the changes with naked eyes.

The fault symptom image data uploaded by the user may be analyzed. In operation 635, fault symptom data tagged with "flicker" in an image captured according to a test procedure for each predefined fault item may be received. In operation 610, a fault image classified as "flicker" corresponding to the "flicker" related fault may be retrieved from the fault symptom image DB. For a comparison, a normal image as well as the fault comparison image classified as "flicker" may be retrieved.

The image of the fault symptom data tagged with "flicker" may be compared to the fault comparison image and the normal image. In an example in which the image of the fault symptom data is classified as the "flicker" fault, a graph may be drawn by scaling an average brightness change in an image frame per unit time from "0" to "1" based on the normal image and the fault comparison image. A graph with respect to the image of the fault symptom data may also be drawing in the same manner. The normal image, the fault comparison image, and the image grape of the fault symptom data may be compared. In a case in which the fault image is classified as the "flicker" fault, a graph showing brightness peak-to-peak variations per unit time may be analyzed to determine whether the fault symptom data corresponds to a normality or a fault, in operation 615. Referring to a graph 640 in which the normal image, the fault comparison image, and the image of the fault symptom data are shown together, the lighting shows quick brightness changes per unit time rather than shining with a constant brightness such that a user may view the changes with naked eyes, and thus the fault symptom data may be determined to correspond to the "flicker" related symptom, in operation 620.

In an example in which the graph of the fault symptom data is similar to or matches the fault graph as a result of determination, the image of the fault symptom data may be recognized as a fault image, labeled with "flicker", and additionally updated and stored in the fault symptom image DB so as to be used as training data in the future, in operation 630, and the fault symptom data may be determined to be the "flicker" fault, in operation 625.

Figure 7:
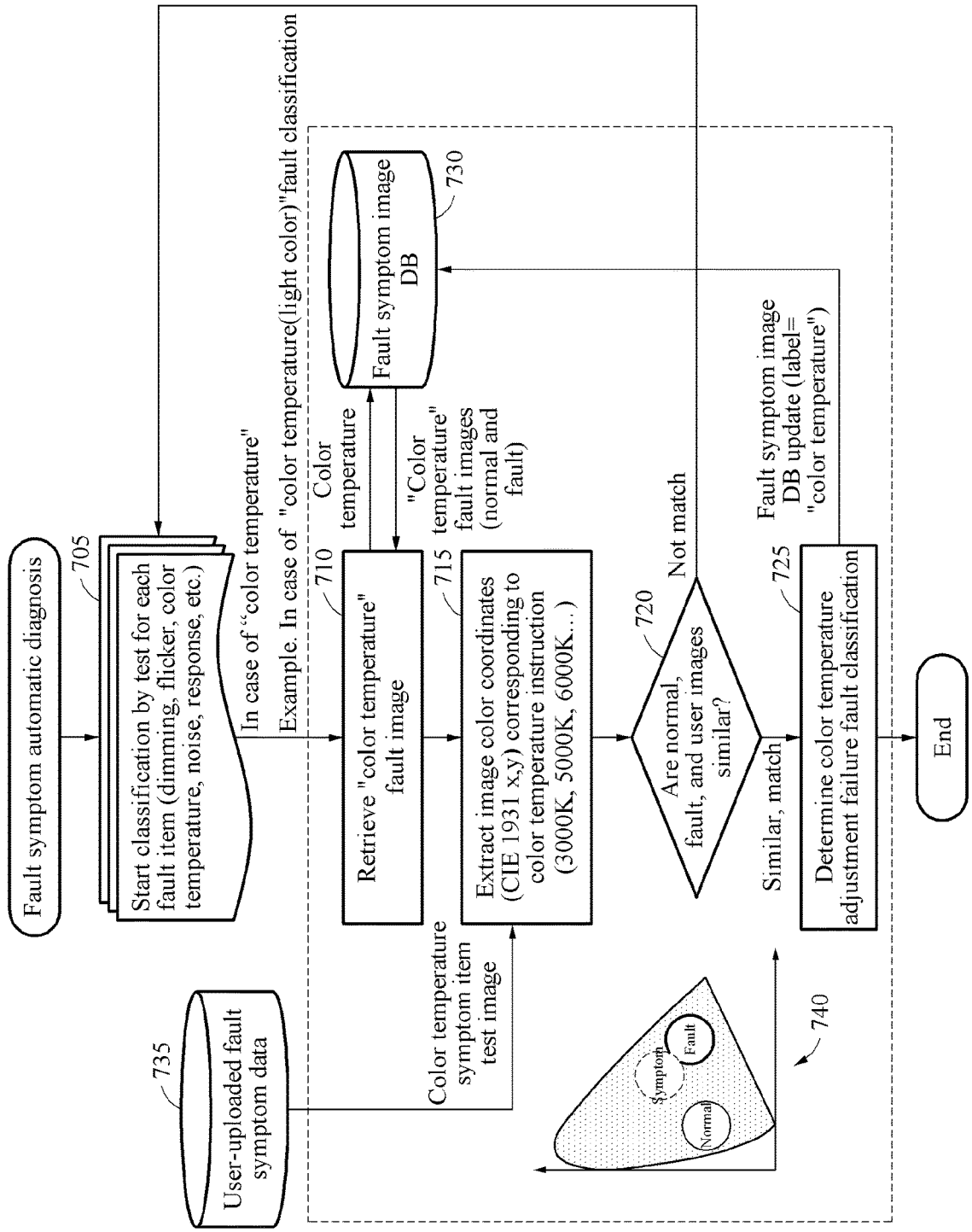
FIG. 7 is a flowchart illustrating a fault symptom automatic diagnosis with respect to a "color temperature" fault according to an example embodiment.

FIG. 7 is a flowchart illustrating a fault symptom automatic diagnosis with respect to a "color temperature" fault according to an example embodiment.

Referring to FIG. 7, a fault symptom automatic diagnosis system may be utilized to diagnose fault symptom data uploaded by a user based on an item. An example in which a lighting fault item corresponds to "color temperature" is illustrated. A "color temperature" related fault may indicate an example in which a lighting fails to represent a desired color temperature (hue) such that a user may view the failure with naked eyes.

The fault symptom image data uploaded by the user may be analyzed. In operation 735, fault symptom data tagged with "color temperature" in an image captured according to a test procedure for each predefined fault item may be received. In operation 610, a fault image classified as "color temperature" corresponding to the "color temperature" related fault may be retrieved from the fault symptom image DB. For a comparison, a normal image as well as the fault comparison image classified as "color temperature" may be retrieved.

The image of the fault symptom data tagged with "color temperature" may be compared to the fault comparison image and the normal image. In an example in which the image of the fault symptom data is classified as the "color temperature" fault, red, green and blue (RGB) of a lighting region may be converted into color coordinates (CIE 1931 x,y) based on the normal image and the fault image and compared to color coordinates of a normality and a fault, in operation 715. Referring to a graph 740 in which the normal image, the fault comparison image, and the image of the fault symptom data are shown together, in an example in which a lighting fails to represent a desired color temperature (hue) such that a user may view the failure with naked eyes, the fault symptom data may be diagnosed to correspond to the "color temperature" related symptom, in operation 720.

In an example in which the graph of the fault symptom data is similar to or matches the fault graph as a result of determination, the image of the fault symptom data may be recognized as a fault image, labeled with "color temperature", and additionally updated and stored in the fault symptom image DB so as to be used as training data in the future, in operation 730, and the fault symptom data may be determined to be the "color temperature" fault, in operation 725.

Figure 8:
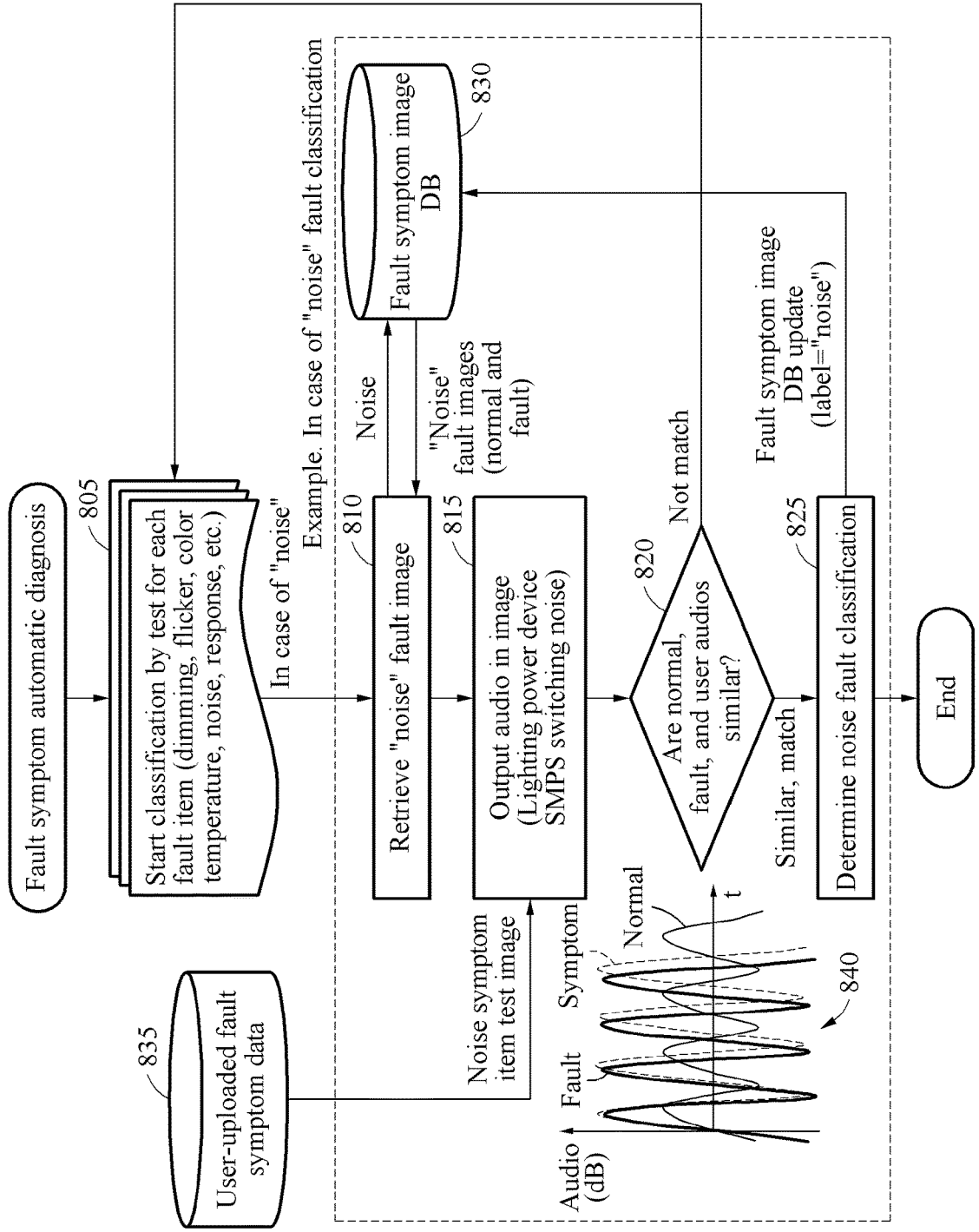
FIG. 8 is a flowchart illustrating a fault symptom automatic diagnosis with respect to a "noise" fault according to an example embodiment.

FIG. 8 is a flowchart illustrating a fault symptom automatic diagnosis with respect to a "noise" fault according to an example embodiment.

Referring to FIG. 8, a fault symptom automatic diagnosis system may be utilized to diagnose fault symptom data uploaded by a user based on an item. An example in which a lighting fault item corresponds to "noise" is illustrated. A "noise" fault may indicate an example in which noise audible to a user occurs.

The fault symptom image data uploaded by the user may be analyzed. The fault symptom data may include audio information and image information. In operation 835, fault symptom data tagged with "noise" in an image captured according to a test procedure for each predefined fault item may be received. In operation 810, a fault image classified as "noise" corresponding to the "noise" related fault may be retrieved from the fault symptom image DB. For a comparison, a normal image as well as the fault comparison image classified as "noise" may be retrieved.

The image of the fault symptom data tagged with "noise" may be compared to the fault comparison image and the normal image. In an example in which the image of the fault symptom data is classified as the "noise" fault, a graph of audio outputs (dB) may be drawn based on the normal image and the fault image, in operation 815. In an example in which an audio output is out of a predetermined frequency range or an amplitude of the audio output exceeds a threshold, the fault symptom data may be diagnosed to correspond to the "noise" related symptom, in operation 820.

In an example in which the graph of the fault symptom data is similar to or matches the fault graph as a result of determination, the image of the fault symptom data may be recognized as a fault image, labeled with "noise", and additionally updated and stored in the fault symptom image DB so as to be used as training data in the future, in operation 830, and the fault symptom data may be determined to be the "noise" fault, in operation 825.

Figure 9:
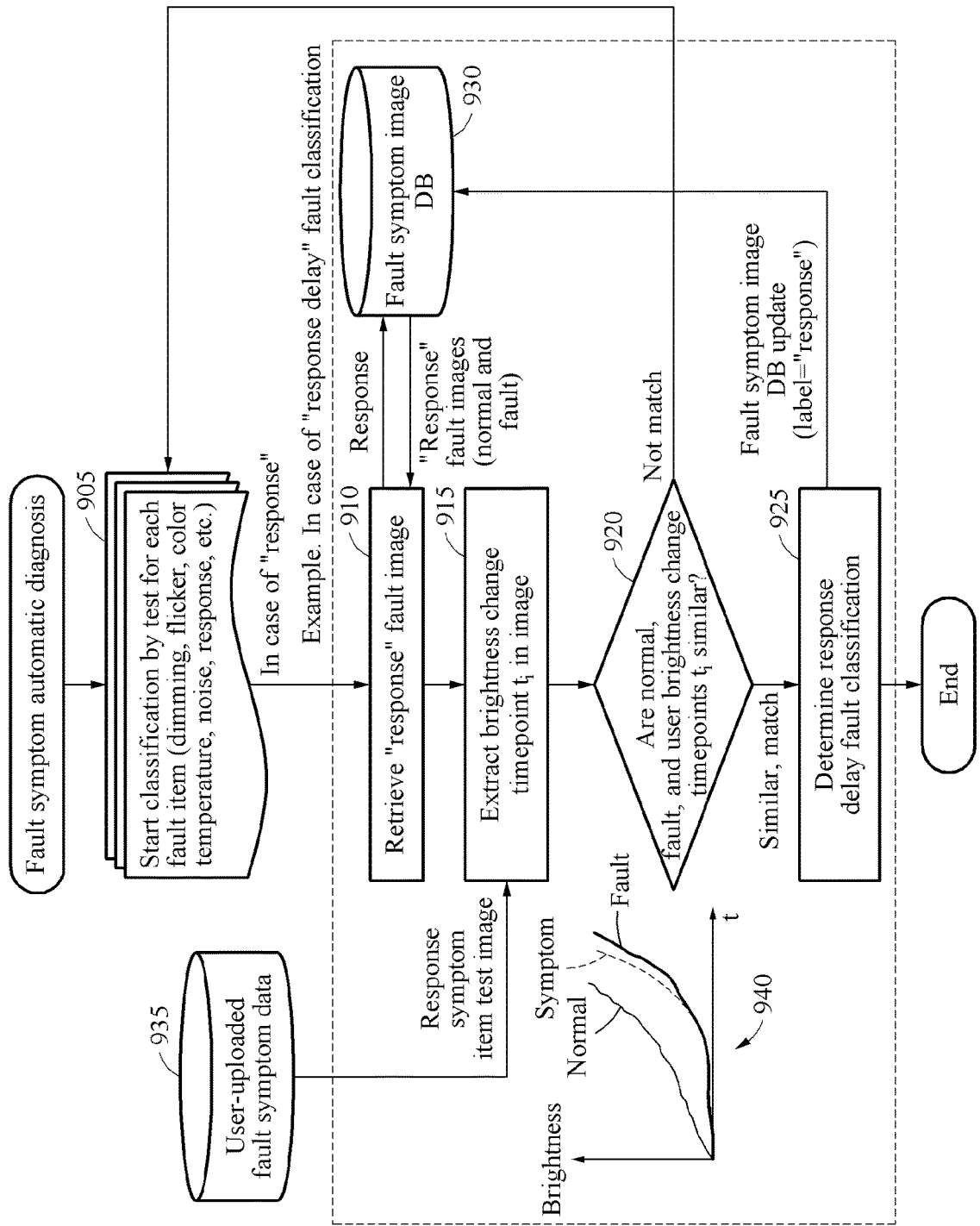
FIG. 9 is a flowchart illustrating a fault symptom automatic diagnosis with respect to a "response" fault according to an example embodiment.

FIG. 9 is a flowchart illustrating a fault symptom automatic diagnosis with respect to a "response" fault according to an example embodiment.

Referring to FIG. 9, a fault symptom automatic diagnosis system may be utilized to diagnose fault symptom data uploaded by a user based on an item. An example in which a lighting fault item corresponds to "response" is illustrated. A "response" fault may indicate an example in which there is no or delayed "response", for example, a lighting control is belated, such that a user may feel the delay.

The fault symptom image data uploaded by the user may be analyzed. In operation 935, fault symptom data tagged with "response" in an image captured according to a test procedure for each predefined fault item may be received. In operation 910, a fault image classified as "response" corresponding to the "response" related fault may be retrieved from the fault symptom image DB. For a comparison, a normal image as well as the fault comparison image classified as "response" may be retrieved.

The image of the fault symptom data tagged with "response" may be compared to the fault comparison image and the normal image. In an example in which the image of the fault symptom data is classified as the "response" fault, an image brightness graph corresponding to an example in which a lighting control occurs in practice from a timepoint at which a lighting control instruction is executed, for example, in an example in which a brightness is changed in practice in response to a brightness control instruction, based on the normal image and the fault image may be drawn, in operation 915. An example in which a lighting control does not occur within a predetermined time may be diagnosed as a fault, in operation 920.

In an example in which the graph of the fault symptom data is similar to or matches the fault graph as a result of determination, the image of the fault symptom data may be recognized as a fault image, labeled with "response", and additionally updated and stored in the fault symptom image DB so as to be used as training data in the future, in operation 930, and the fault symptom data may be determined to be the "response" fault, in operation 925.

Figure 10:
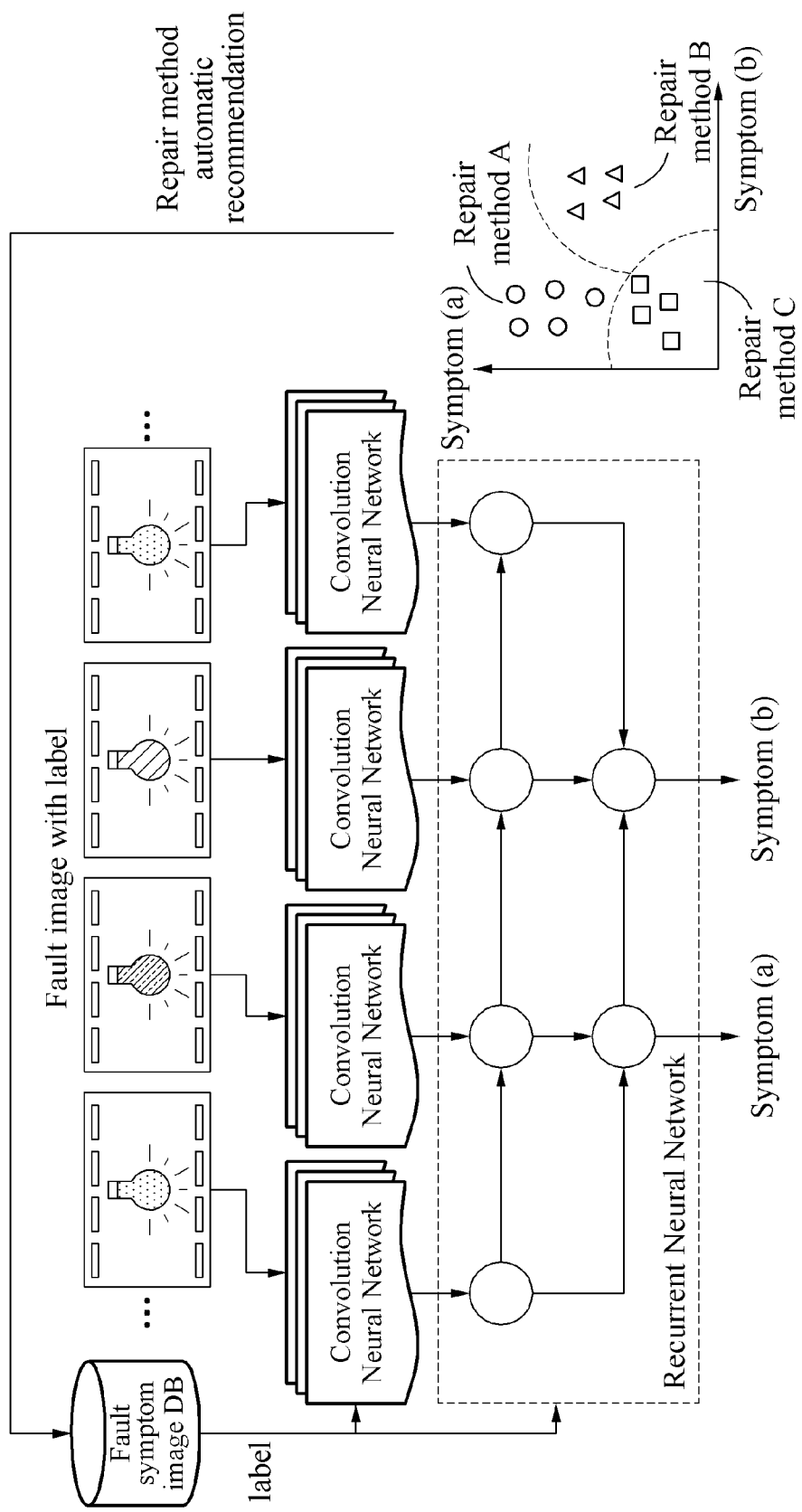
FIG. 10 illustrates a repair method recommendation system according to an example embodiment.

FIG. 10 illustrates a repair method recommendation system according to an example embodiment.

Referring to FIG. 10, training data with fault labels as a result of fault classification may be accumulated in a fault symptom image DB. The data accumulated in the DB may be used for training through deep learning. A repair method may be recommended based on the data used for training.

For example, a feature map may be generated using a convolution neural network in a unit of frame of each fault image, and each feature map may be connected to a recurrent neural network to extract feature vectors (symptom (a), symptom (b), . . . ) characterizing the corresponding fault. A repair method suitable for a symptom may be recommended based on the feature vectors.

A type of fault may be classified in various manners. The neural network may classify a type of fault differently based on a combination of a plurality of symptoms and recommend a repair method based on the classified type of fault.

Figure 11:
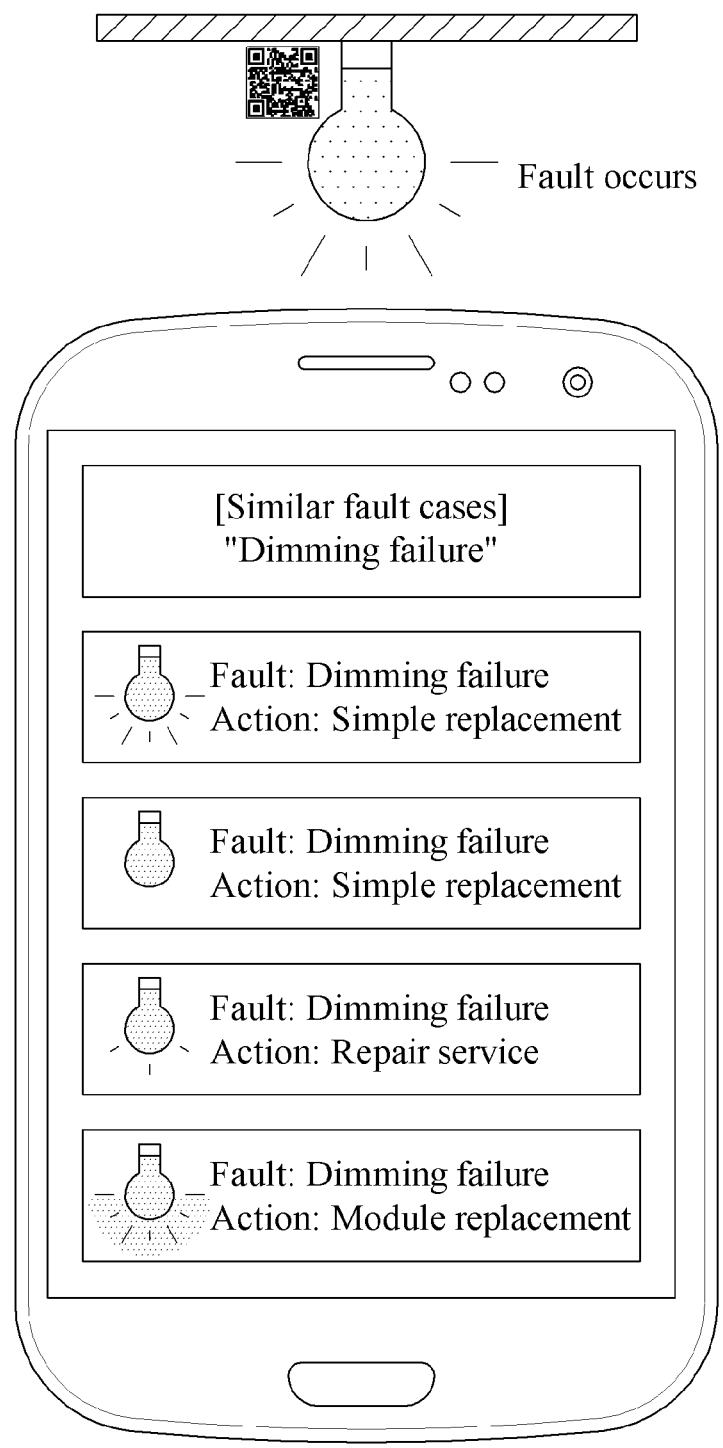
FIG. 11 illustrates an example of recommending a repair method according to an example embodiment.

FIG. 11 illustrates an example of recommending a repair method according to an example embodiment.

Referring to FIG. 11, when a fault of a system lighting is notified through a smart phone of a user, repair methods corresponding to a fault classification determined by a system lighting fault automatic classification system may be retrieved from a system lighting fault cloud DB and displayed on a screen of the smart phone based on the fault classification, and the user may read the repair methods and determine whether to simply perform a self-repair or a repair service request, whereby the total maintenance cost may be reduced.

According to example embodiments, it is possible to capture an image of a fault of a system lighting including a smart light, a smart sensor, a gateway, a user input device, and a control device through a smart phone app, receive similar fault symptom and repair case information from an automatically classified fault DB, and help a user to directly determine whether to perform a self-repair such as power restart, module reinsertion or product replacement or a repair service request, whereby a total maintenance cost of the system lighting may be reduced.

The components described in the exemplary embodiments of the present invention may be achieved by hardware components including at least one Digital Signal Processor (DSP), a processor, a controller, an Application Specific Integrated Circuit (ASIC), a programmable logic element such as a Field Programmable Gate Array (FPGA), other electronic devices, and combinations thereof. At least some of the functions or the processes described in the exemplary embodiments of the present invention may be achieved by software, and the software may be recorded on a recording medium. The components, the functions, and the processes described in the exemplary embodiments of the present invention may be achieved by a combination of hardware and software.

The method according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method for fault diagnosis of a lighting, the method comprising:

receiving one or more fault symptom data of tests for each of one or more predetermined fault items, the one or more fault symptom data tagged with the one or more predetermined fault items, based on the tests for each of the one or more predetermined fault items;

determining a first fault item among the one or more predetermined fault items;

retrieving a fault comparison image corresponding to the first fault item from a fault symptom image database (DB);

diagnosing whether one tagged with the first fault item among the one or more fault symptom data corresponds to the first fault item by comparing the fault symptom data tagged with the first fault item to the fault comparison image; and recommending a repair method based on the fault symptom image DB when the fault symptom data tagged with the first fault item corresponds to the first fault item.

2. The method of claim 1, wherein the determining is iteratively performed while a predetermined condition is satisfied.

3. The method of claim 2, wherein the predetermined condition includes a condition to iteratively perform the determining with respect to all of the one or more predetermined fault items in an order of high frequency count.

4. The method of claim 1, wherein the recommending comprises recommending the repair method using a neural network trained with data accumulated in the fault symptom image DB through deep learning.

5. The method of claim 1, further comprising:

labeling and storing the fault symptom data tagged with the first fault item in the fault symptom image DB when the fault symptom data tagged with the first fault item corresponds to the first fault item.

6. The method of claim 1, wherein the diagnosing comprises:

determining a predetermined determination method corresponding to the first fault item; and comparing the fault symptom data tagged with the first fault item to the fault comparison image based on the predetermined determination method.

7. The method of claim 6, wherein the predetermined determination method comprises at least one of a per unit time brightness change data comparison, a per unit time brightness peak-to-peak variation comparison, an image color coordinate comparison, an image audio output comparison, and a brightness change timepoint comparison.

8. The method of claim 1, wherein the diagnosing comprises diagnosing whether a fault occurs using a data comparison algorithm including a mean squared error (MSE) and a correlation analysis.

9. The method of claim 1, wherein the fault symptom data include audio information and image information.

10. The method of claim 1, wherein the one or more predetermined fault items include at least one of dimming, a flicker, a color temperature, noise, and a response delay.

11. An apparatus for fault diagnosis of a lighting, the apparatus comprising:

at least one processor; and a non-transitory computer-readable medium having instructions stored thereon, which, when executed by the at least one processor, causes the at least one processor to function as:

a receiver configured to receive one or more fault symptom data of tests for each of one or more predetermined fault items, the one or more fault symptom data tagged with the one or more predetermined fault items, based on the tests for each of the one or more predetermined fault items;

a fault symptom image database (DB) in which a fault symptom image is pre-stored;

a diagnoser configured to determine a first fault item among the one or more predetermined fault items, retrieve a fault comparison image corresponding to the first fault item from a fault symptom image DB, and diagnose whether one tagged with the first fault item among the one or more fault symptom data corresponds to the first fault item by comparing the fault symptom data tagged with the first fault item to the fault comparison image; and a recommender configured to recommend a repair method based on the fault symptom image DB when the fault symptom data tagged with the first fault item corresponds to the first fault item.

12. A method of generating fault symptom data, the method comprising:

controlling a lighting by executing a test control instruction for each fault item;

capturing an image of the lighting;

tagging and storing the captured image for each fault item;

receiving a user opinion in relation to a fault symptom;

generating fault symptom data of a test for each fault item based on device information of the lighting, the tagged image, and the user opinion; and transmitting the fault symptom data of the test for each fault item to a server.

13. The method of claim 12, further comprising:

automatically extracting unique information of the lighting by recognizing a quick response (QR) code attached to the lighting.

14. The method of claim 12, further comprising:

performing an image segmentation to segment a region corresponding to the lighting in all frames of the captured image; and normalizing the image.

\* \* \* \* \*